United States Patent
Durix et al.

(10) Patent No.: US 10,174,821 B2
(45) Date of Patent: Jan. 8, 2019

(54) ELECTROHYDRAULIC ACTUATOR

(71) Applicant: Robert Bosch GmbH, Stuttgart (DE)

(72) Inventors: Lucas Durix, Drusenheim (FR); Stephan Kohler, Buehl (DE); Hartmut Krueger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 380 days.

(21) Appl. No.: 14/905,854

(22) PCT Filed: Jul. 3, 2014

(86) PCT No.: PCT/EP2014/064225
§ 371 (c)(1),
(2) Date: Jan. 18, 2016

(87) PCT Pub. No.: WO2015/007535
PCT Pub. Date: Jan. 22, 2015

(65) Prior Publication Data
US 2016/0160969 A1  Jun. 9, 2016

(30) Foreign Application Priority Data

Jul. 16, 2013 (DE) .................. 10 2013 213 888

(51) Int. Cl.
*F16H 25/00* (2006.01)
*F16H 25/24* (2006.01)
(Continued)

(52) U.S. Cl.
CPC .......... *F16H 25/2454* (2013.01); *B60T 1/005* (2013.01); *B60T 13/745* (2013.01);
(Continued)

(58) Field of Classification Search
CPC ................. F16H 25/2454; F16H 25/20; F16H 2025/209; F16H 2025/2084; B60T 13/745;
(Continued)

(56) References Cited

U.S. PATENT DOCUMENTS

| 4,850,650 A | 7/1989 | Eckert et al. |
| 5,015,040 A * | 5/1991 | Lin ....................... B60T 8/1764 188/181 C |

(Continued)

FOREIGN PATENT DOCUMENTS

| CN | 1451888 A | 10/2003 |
| DE | 19700935 | 8/1997 |

(Continued)

OTHER PUBLICATIONS

International Search Report for Application No. PCT/EP2014/064225 dated Aug. 3, 2015 (English Translation, 2 pages).

*Primary Examiner* — Victor L MacArthur
(74) *Attorney, Agent, or Firm* — Michael Best & Friedrich LLP

(57) ABSTRACT

The invention relates to an electrohydraulic actuator comprising a hydraulic piston, a spindle drive for moving the piston along an axis of rotation, wherein the spindle drive comprises a spindle and a nut, and a worm wheel, which is coaxially attached to the nut. Furthermore, an electric motor having a worm, which meshes with the worm wheel, is provided. The nut is radially and axially supported by means of a bearing. In addition, there is a single-armed rotation-prevention mechanism in order to prevent the spindle from rotating. An angle with respect to the axis of rotation is included between a point of action of the worm on the worm wheel and the effective direction of the rotation-prevention mechanism, wherein the angle is selected in such a way that, (Continued)

for a predetermined torque acting on the nut, a radial force acting on the piston is minimized.

10 Claims, 5 Drawing Sheets

(51) Int. Cl.

| | | |
|---|---|---|
| *F16H 25/20* | (2006.01) | |
| *F16D 65/28* | (2006.01) | |
| *F16D 23/12* | (2006.01) | |
| *F16D 25/08* | (2006.01) | |
| *F16D 28/00* | (2006.01) | |
| *F16D 29/00* | (2006.01) | |
| *B60T 1/00* | (2006.01) | |
| *B60T 13/74* | (2006.01) | |
| *F16D 121/04* | (2012.01) | |
| *F16D 121/24* | (2012.01) | |
| *F16D 125/40* | (2012.01) | |
| *F16D 125/52* | (2012.01) | |

(52) U.S. Cl.
CPC ............ *F16D 23/12* (2013.01); *F16D 25/088* (2013.01); *F16D 28/00* (2013.01); *F16D 29/005* (2013.01); *F16D 65/28* (2013.01); *F16H 25/20* (2013.01); *F16D 2025/081* (2013.01); *F16D 2121/04* (2013.01); *F16D 2121/24* (2013.01); *F16D 2125/40* (2013.01); *F16D 2125/52* (2013.01); *F16H 2025/209* (2013.01); *F16H 2025/2084* (2013.01)

(58) Field of Classification Search
CPC ........ B60T 1/005; F16D 29/005; F16D 23/12; F16D 25/088; F16D 28/00; F16D 65/28; F16D 2125/40; F16D 2125/52; F16D 2025/081; F16D 2121/04; F16D 2121/24
See application file for complete search history.

(56) References Cited

U.S. PATENT DOCUMENTS

| | | | |
|---|---|---|---|
| 6,318,516 B1* | 11/2001 | Zernickel | B60T 13/741 188/157 |
| 6,457,783 B1* | 10/2002 | Schanzenbach | B60T 13/745 188/156 |
| 2004/0026190 A1 | 2/2004 | Murayama et al. | |
| 2010/0176652 A1 | 7/2010 | Arakawa | |
| 2012/0217117 A1 | 8/2012 | Gramann et al. | |

FOREIGN PATENT DOCUMENTS

| | | |
|---|---|---|
| DE | 102010047800 | 5/2011 |
| DE | 102011078360 | 1/2013 |
| EP | 0743470 A1 | 11/1996 |
| GB | 2351129 | 12/2000 |
| JP | 2002070901 | 3/2002 |
| WO | 2013/083039 | 6/2013 |

* cited by examiner

ELECTROHYDRAULIC ACTUATOR

BACKGROUND OF THE INVENTION

The invention relates to an electrohydraulic actuator. In particular, the invention relates to an actuator for actuating a hydraulic system on board a motor vehicle.

A system on board a motor vehicle, e.g. a clutch or brake system, can be actuated hydraulically. In a conventional motor vehicle driven by means of an internal combustion engine, the hydraulic pressure can be supplied by a pump coupled to the internal combustion engine. Sometimes, it is desirable also to be able to supply the hydraulic pressure independently of the internal combustion engine. In an electric or hybrid vehicle, it is not possible to assume in all circumstances that there will be torque available from a motor of the motor vehicle to drive the pump or that there will be a vacuum from the intake manifold to support a vacuum brake booster, for example.

An electrohydraulic actuator comprises an electric drive and a hydraulic pump. The drive acts on the pump, which supplies a hydraulic pressure of a fluid for actuating the clutch or the brake, for example. In one embodiment, an axial pump is used, comprising a hydraulic cylinder with a piston which can be actuated axially by means of a spindle drive. The spindle drive comprises a spindle and a nut, wherein the spindle is secured against rotation by means of a rotation-prevention mechanism and the nut can be rotated by means of the electric motor. In order to transmit the rotary motion of the electric motor to the nut and, at the same time, to reduce its speed, a worm gear can be used, for example.

Owing to the unavoidable friction between the nut and the spindle and the gearing forces on the nut, there is not only a torque but also a tilting force acting on the nut when the electric motor is running. As a result, a radial force can be transmitted to the piston, pressing the piston against the cylinder wall. The piston or a piston seal can thereby be subjected to increased wear. Particularly in the case of a system relevant to safety, such as an electrohydraulic actuator for a brake system, it can be crucial to ensure the full performance of the actuator, even over extended periods of operation.

SUMMARY OF THE INVENTION

It is therefore the object of the present invention to indicate an electrohydraulic actuator which provides reduced wear of the piston.

An electrohydraulic actuator comprises a hydraulic piston, a spindle drive for moving the piston along an axis of rotation, wherein the spindle drive comprises a spindle and a nut, and a worm wheel, which is attached coaxially to the nut. An electric motor having a worm, which meshes with the worm wheel, is furthermore provided. The nut is supported radially and axially by means of a bearing, and there is furthermore a single-armed rotation-prevention mechanism for securing the spindle against rotation. An angle with respect to the axis of rotation is included between a point of action of the worm on the worm wheel and the direction of action of the rotation-prevention mechanism. In this case, the angle is selected in such a way that, for a predetermined torque acting on the nut, a radial force acting on the piston is minimized.

The appropriate choice of angle makes it possible to partially or fully compensate the tilting forces imposed on the spindle by the electric motor. By minimizing the radial forces acting on the piston, it is possible to reduce wear of the piston or of a sealing means for the piston in relation to a hydraulic cylinder. The performance of the actuator can thus be maintained, even after frequent actuation. Leakage between the piston and the cylinder can be reduced, and a hydraulic pressure supplied by the actuator can be maintained, even after a prolonged period of operation.

It is not necessary to use a second bearing to provide radial support for the piston or the spindle. As a result, weight and installation space can be saved, and therefore the actuator can be made more compact and lighter. Moreover, the absence of a need for a second bearing makes it possible to save costs in production.

In one embodiment, the radial bearing allows a predetermined tilt of the nut relative to the axis of rotation. A tilt angle of the spindle relative to the axis of rotation can be limited by the bearing. The tilt angle can compensate for offset misalignment or angular misalignment between the hydraulic unit, which comprises the piston and, where applicable, a cylinder surrounding the latter, and the gear unit with the spindle. Acceptable tolerances of individual components of the actuator can be increased, thereby making it possible to save production costs. Moreover, the play compensation makes it possible to reduce wear during the operation of the actuator. By way of example, the radial bearing can advantageously be embodied as a rolling bearing, in particular as a radial deep groove ball bearing. In this way a high-performance and low-wear standard component can be used to provide the limited tiltability of the spindle.

In another preferred embodiment, the radial bearing is arranged between the nut and the rotation-prevention mechanism in the axial direction. A compact construction of the actuator can thereby be achieved. Moreover, it is possible for the forces on the actuator to be balanced out more effectively in this way, so as to cancel each other out.

It is furthermore preferred that the angle be determined with respect to a predetermined axial position of the spindle. An effective lever between the piston and a tilting point of the spindle can influence the radial forces on the piston. By taking account of the position of the spindle, the actuator can be matched to a predetermined operating point. For example, the position of the spindle can correspond to an actuation of the clutch or brake on board the motor vehicle for which the actuator is provided.

The angle can also be determined with respect to a predetermined friction coefficient between the worm and the worm wheel. The friction coefficient can be determined relatively accurately and can be determinable, for example, through the use of a lubricant, even under different operating conditions and over a prolonged time in operation.

It is furthermore preferred that the torque acting on the nut be determined by way of a maximum force acting on the piston in the axial direction. The force can be determinable on the basis of an operating pressure or maximum pressure which is to be exerted by the piston on a hydraulic fluid. Determining the torque on the basis of the axial force on the piston enables the actuator to be designed more effectively in such a way that the radial forces on the piston are reduced at the usual or maximum system load.

BRIEF DESCRIPTION OF THE DRAWINGS

The invention is now described in greater detail with reference to the attached figures, of which.

DETAILED DESCRIPTION

Figure 1:
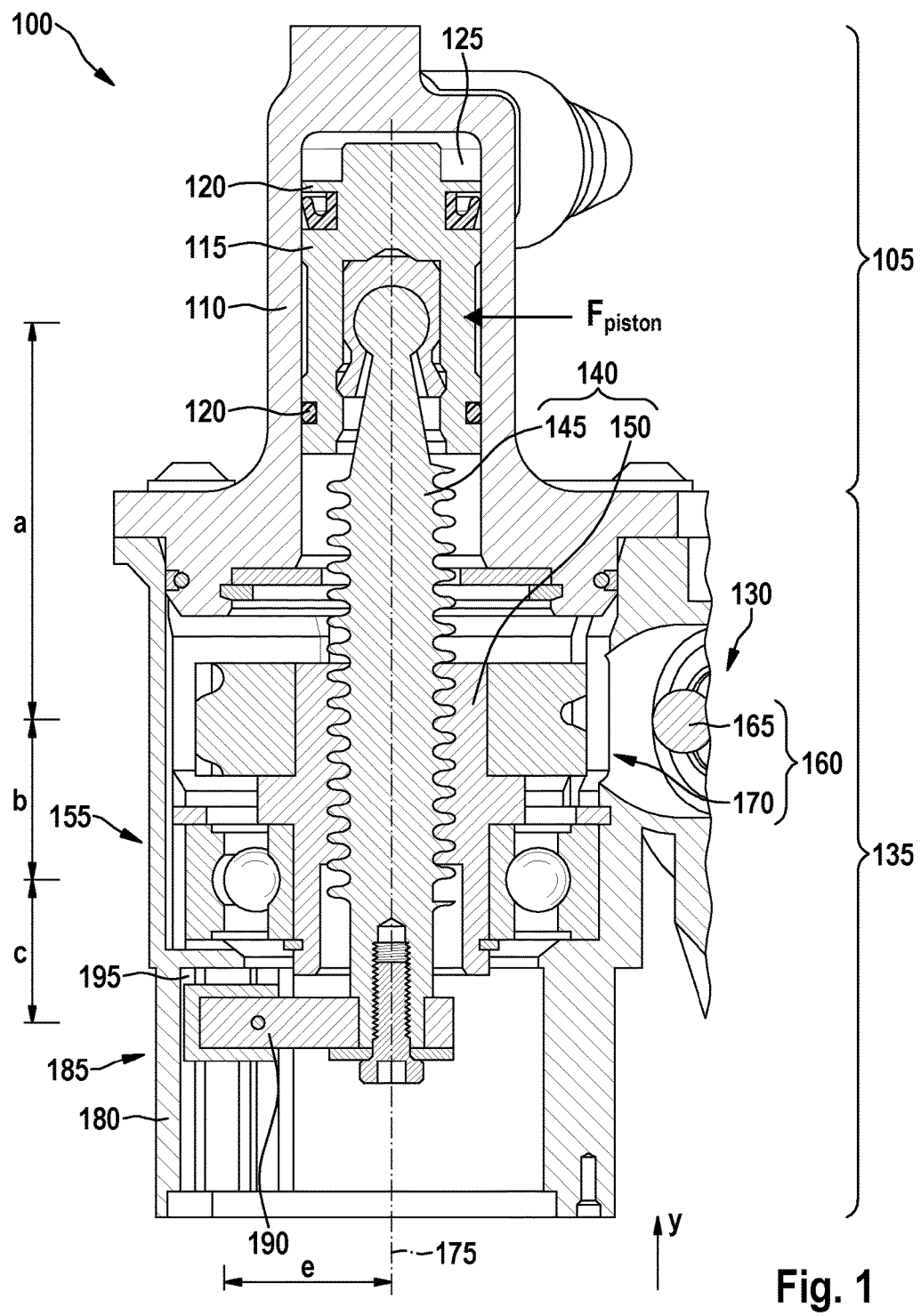
FIG. 1 shows an electrohydraulic actuator.

FIG. 1 shows an electrohydraulic actuator 100 for supplying a hydraulic pressure, in particular for actuating a brake or a clutch on board a motor vehicle. The actuator 100 comprises a hydraulic module 105, which comprises a cylinder 110 and a piston 115 accommodated therein. To seal the piston 115 relative to the cylinder 110, a piston ring 120 or some other radial seal is preferably provided. The cylinder 115 contains a hydraulic fluid 125, which is put under pressure when the piston 115 is pushed into the cylinder 110. The actuator 100 furthermore comprises an electric motor 130 and a gear unit 135 for transmitting a movement of the electric motor 130 to the hydraulic module 105. The gear unit 135 comprises a spindle drive 140, which, for its part, comprises a spindle 145 and a nut 150, a radial bearing 155 and a worm gear 160, which comprises a worm 165 and a worm wheel 170. The worm 165 meshes in the worm wheel 170, wherein an axis of rotation of the electric motor 130 includes an angle with the plane of representation, with the result that a point of action of the worm 165 on the worm wheel 170 is not visible in FIG. 1. The worm wheel 170 is attached positively and coaxially to the nut 150 and both elements can be rotated about an axis of rotation 175. The axis of rotation 175 is oblique with respect to the axis of rotation of the electric motor 130. In the radial direction, the radial bearing 155 is preferably arranged between the nut 150 or the point of action of the worm 165 on the worm wheel 170 and the rotation-prevention mechanism 185.

The nut 150 with the worm wheel 170 is supported by means of the radial bearing 155, e.g. relative to a housing 180. The radial bearing 155 is preferably embodied as a rolling bearing, in particular as a ball bearing. Here, the radial bearing 155 preferably allows a certain tilting of the nut 150 relative to the direction of motion of the piston 115. The axis of rotation 175 can thus assume a predetermined maximum tilt angle relative to the direction of motion of the piston 115. By allowing the tilt angle, it is possible to compensate an offset misalignment or an angular misalignment between the axis of rotation 175 and the direction of motion of the piston 115.

The spindle 145 is attached to the piston 115 at a first end. In the embodiment shown, the spindle 145 carries a ball at the first end, and the cylinder 115 has a ball socket corresponding thereto, allowing axial forces to be exchanged between the spindle 145 and the piston 115, while tilting of the piston 115 by the spindle 145 is prevented. A rotation-prevention mechanism 185 is attached at its opposite, second end of the spindle 145. The rotation-prevention mechanism 185 comprises a lever arm 190, which extends in a radial direction, and an axial groove 195, in which a radially outer end of the lever arm 190 is received. Other embodiments which prevent rotation of the lever arm 190 with respect to the housing 180 and simultaneously allow an axial motion are likewise possible, e.g. a slide rail. To assist the tilting of the nut 150, it is preferred that the rotation-prevention mechanism 185 should not absorb any radial or tilting forces.

A coordinate system in FIG. 1 is shown only in part. The y direction extends parallel to the axis of rotation 175 and the z direction extends parallel to the shaft of the electric motor 130. The x direction forms a right-handed coordinate system with the y direction and the z direction.

The following dimensions are furthermore defined in FIG. 1:

a axial distance between the point of action of the spindle 145 on the piston 115 and the point of action of the worm 165 on the worm wheel 170;

b axial distance between the radial bearing 155 and the point of action of the worm 165 on the worm wheel 170;

c axial distance between the radial bearing 155 and the rotation-prevention mechanism 185;

d radial distance between the axis of rotation 175 and the point of action between the worm 165 and the worm wheel 170 (not visible), and e radial distance between the central point of support of the rotation-prevention mechanism 185 and the axis of rotation 175.

Figure 2:
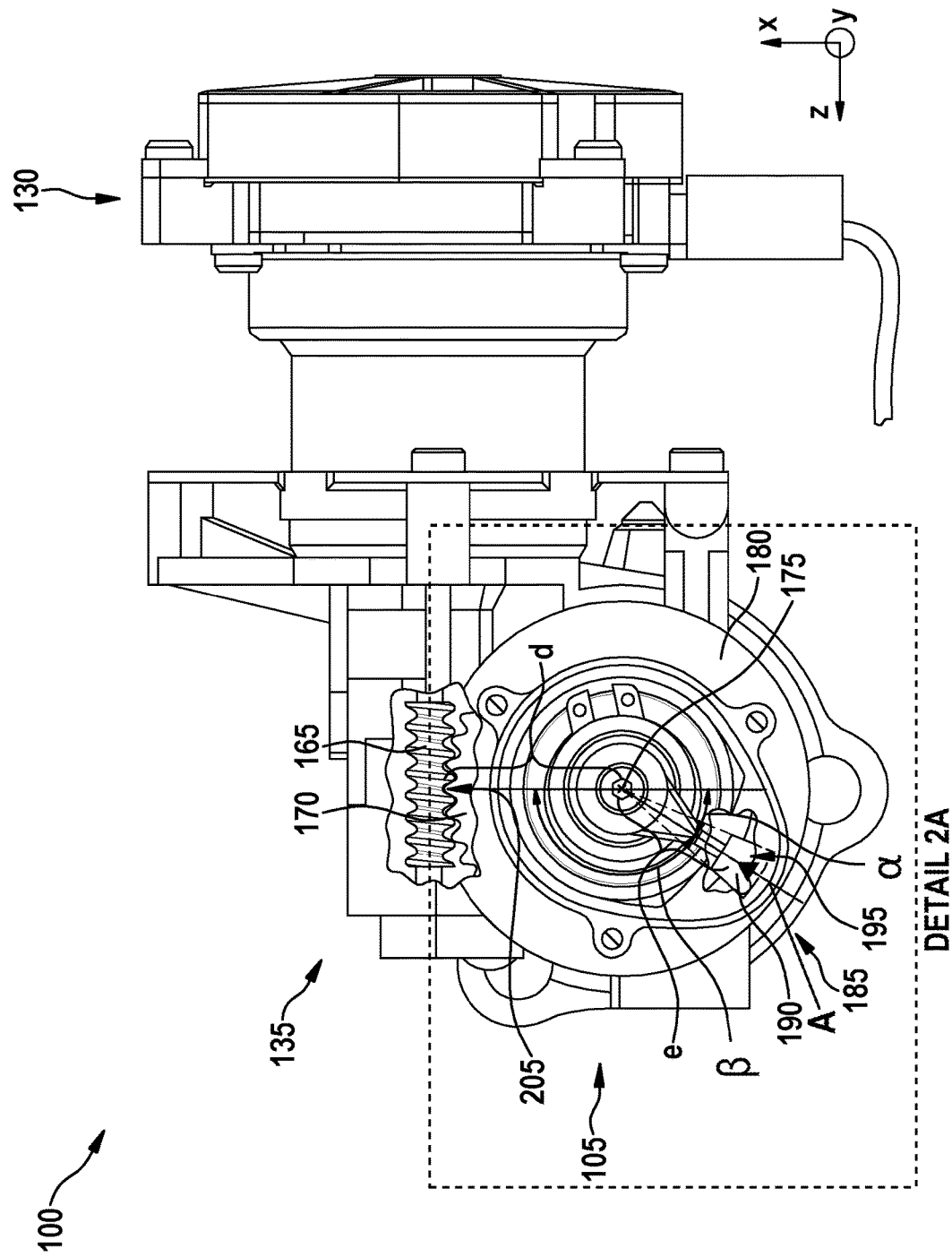
FIG. 2 the actuator from FIG. 1 in another view.
Figure 2A:
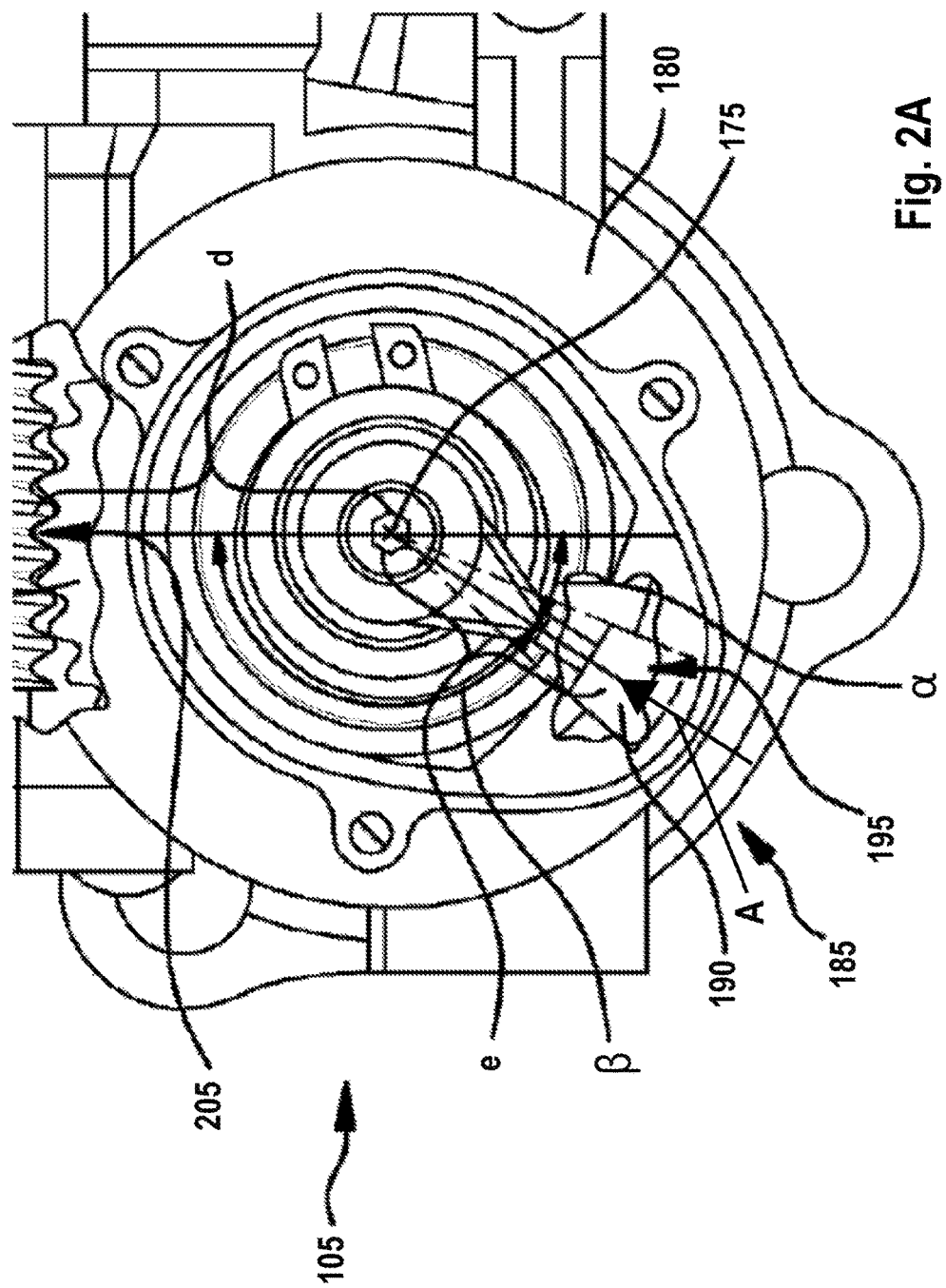
FIG. 2A a detail view of a portion of the actuator of FIG. 2.

FIG. 2 shows the actuator 100 in another view. The axis of rotation 175 or axis of motion of the piston 115 in the cylinder 110 extends perpendicularly to the plane of representation. In the plane of representation, the axis of rotation of the electric motor 100, which extends obliquely to the axis of rotation 175, extends in a horizontal direction. The worm 165 and the worm wheel 170, which mesh with one another, are shown in a partial section. Here, a point of action 205 refers to the point at which a tensile or shear force is transmitted between the worm 165 and the worm wheel 170. The point of action 205 is at a predetermined distance and has a predetermined alignment with respect to the axis of rotation 175.

In a similar way, the rotation-prevention mechanism 185 is partially cut away. The bearing point of the lever arm 190 on the groove 195 has a predetermined rotational alignment with respect to the axis of rotation 175 and is at a predetermined distance therefrom. The rotational alignment is also referred to as the direction of action A. An angle between the direction of action A and a radius connecting the axis of rotation 175 to the point of action 205 is referred to as β. A second angle α complements β to give 180°. The direction of action A is shown relative to a center line of the lever arm 190. For more precise determination, the direction of action A can instead pass through the effective contact area between the lever arm 190 and the groove 195 and the axis of rotation 175. In the case of the usual loading of the actuator 100, the effective contact area is that shown on the right in FIG. 2.

Figure 3:
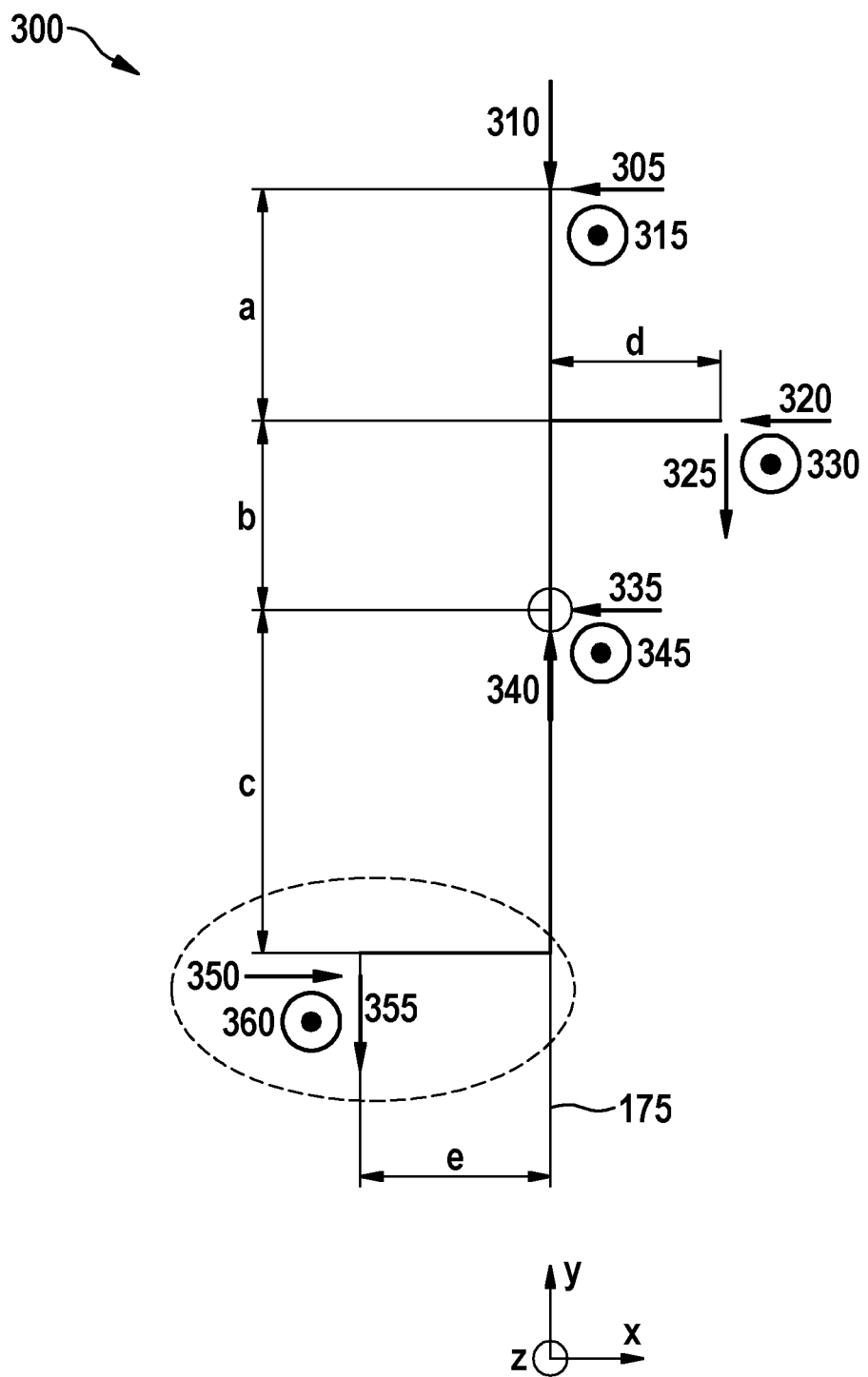
FIG. 3 shows a force and torque diagram for the actuator in FIGS. 1 and 2.

FIG. 3 shows a force and torque diagram for the actuator 100 in FIGS. 1 and 2. The alignment corresponds to that in FIG. 1. From the top down, the forces shown relate to the piston 115, the worm wheel 170, the radial bearing 155 and the rotation-prevention mechanism 185. The forces of the rotation-prevention mechanism 185, which are shown in an ellipse in dashed lines, have been rotated by the angle α out of the plane of the drawing. For further explanation, the following designations are used:

$F_{x\_piston}$ 305

$F_{y\_piston}$ 310

$F_{z\_piston}$ 315

$F_{x\_worm\ wheel}$ 320

$F_{y\_worm\ wheel}$ 325

$F_{z\_worm\ wheel}$ 330

$F_{x\_bearing}$ 335

$F_{y\_bearing}$ 340

$F_{z\_bearing}$ 345

$F_{x\_rot.-prev.mech.}$ 350

$F_{y\_rot.-prev.mech.}$ 355

$F_{z\_rot.-prev.mech.}$ 360

$F_{rot.-prev.mech.}$ 365

Figure 4:
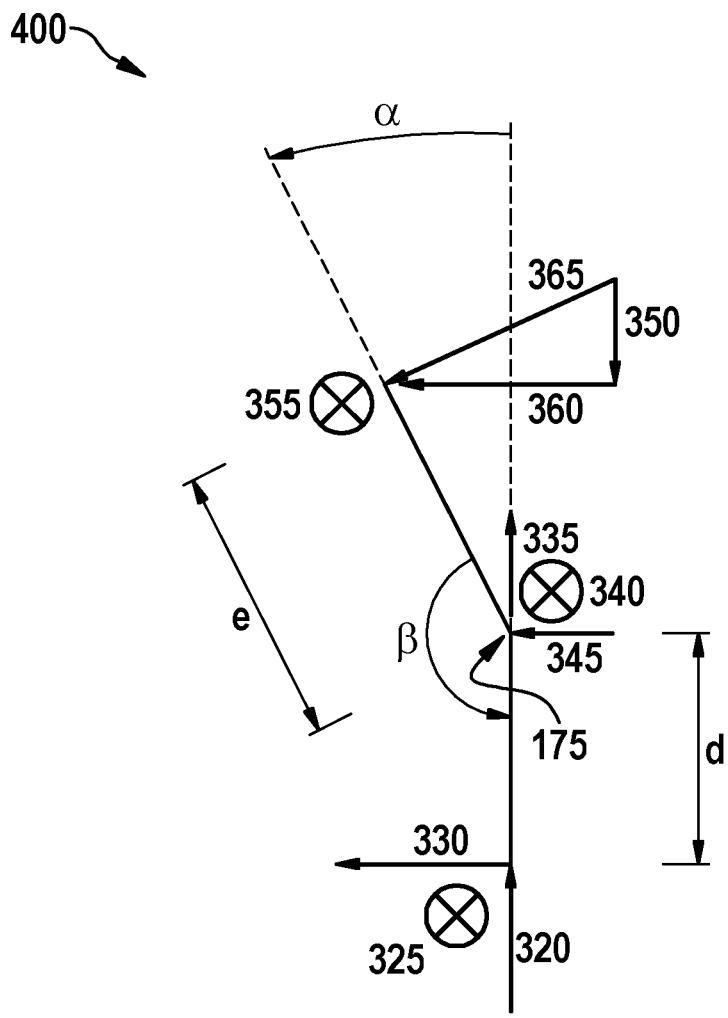
FIG. 4 shows another force and torque diagram for the actuator in FIGS. 1 and 2.

FIG. 4 shows another force and torque diagram 400 for the actuator 100 in FIGS. 1 and 2. The illustration corresponds to that in FIG. 3 from a different perspective. The selected view corresponds to that in FIG. 2.

In order to minimize the forces acting radially on the piston 115, $F_{piston}$ must be minimized. Here:

$$F_{piston} = \sqrt{F_{x\_piston}^2 + F_{z\_piston}^2}$$

$$F_{x\_rot.-prev.mech.} = F_{rot.-prev.mech.} \cdot \sin \alpha$$

$$F_{z\_rot.-prev.mech.} = F_{rot.-prev.mech.} \cdot \cos \alpha$$

$$F_{y\_rot.-prev.mech.} = F_{rot.-prev.mech.} \cdot \mu$$

$\mu$=sliding friction coefficient
Force and torque balance:

$$\Sigma F_x = -F_{x\_piston} - F_{x\_worm\ wheel} - F_{x\_bearing} + F_{x\_rot.-prev.mech.} = 0$$

$$\Sigma F_y = -F_{y\_piston} - F_{y\_worm\ wheel} + F_{y\_bearing} - F_{y\_prev.mech.} = 0$$

$$\Sigma F_z = F_{z\_piston} + F_{z\_worm\ wheel} + F_{z\_bearing} + F_{z\_rot.-prev.mech.} = 0$$

$$\Sigma M_x = F_{z\_piston}(a+b) + F_{z\_worm\ wheel}b - F_{z\_rot.-prev.mech.}c + F_{y\_rot.-prev.mech.}e \sin \alpha = 0$$

$$\Sigma M_y = -F_{z\_worm\ wheel}d + F_{rot.prev.mech}e = 0$$

$$\Sigma M_z = F_{x\_piston}(a+b) + F_{x\_worm\ wheel}b - F_{y\_worm\ wheel}d + F_{x\_rot.-prev.mech.} + F_{y\_rot.-prev.mech.}e \cos \alpha = 0$$

Given, known variables:
The maximum effective piston force $F_{y\_piston}$
The maximum effective gearing forces $F_{x\_worm\ wheel}$, $F_{y\_worm\ wheel}$, $F_{z\_worm\ wheel}$
The installation space conditions a, b, c, d, e
The sliding friction coefficient $\mu$, assumed to be 0.15 for example.

Unknown variables:
$F_{x\_piston}$
$F_{z\_piston}$
$F_{rot.-prev.mech.}$
$\alpha$
$F_{x\_bearing}$
$F_{y\_bearing}$
$F_{z\_bearing}$ The forces $F_{x\_piston}$ and $F_{z\_piston}$ are specified as a magnitude limitation. In particular, a resultant force acting radially on the piston 115 and composed of $F_{x\_piston}$ and $F_{z\_piston}$, $F_{piston}$ can be limited in magnitude as a design stipulation. This design stipulation can be obtained from empirical values in respect of the wear behavior of the piston 115 and of the cylinder 110. For example, it can be stipulated that the radial piston force $F_{piston}$ must not exceed a certain amount when the actuator 100 is at a predetermined operating point. The operating point can be given by a hydraulic operating pressure of the hydraulic fluid 125 or a position of the spindle 145 along the axis of rotation 175, for example.

In order to minimize the radial piston forces $F_{piston}$, $\alpha$ needs to be optimized. For example, $\alpha$ can be set to different values in a test series, while the system of six equations indicated above is resolved in respect of the remaining six unknown variables. The system of equations is therefore determined and there is always a unique solution. $\alpha$ is then chosen in such a way that $F_{x\_piston}$ and $F_{z\_piston}$ are minimized, with the result that the force acting radially on the piston 115, $F_{piston}$ is likewise minimized.

The invention claimed is:
1. An electrohydraulic actuator (100) comprising
a hydraulic piston (115);
a spindle drive (140), comprising a spindle (145) and a nut (150), for moving the piston (115) along an axis of rotation (175);
a worm wheel (170), which is attached coaxially to the nut (150);
an electric motor (130) having a worm (165), which meshes with the worm wheel (170);
a radial bearing (155) for supporting the nut (150), and
a single-armed rotation-prevention mechanism (185) for securing the spindle (145) against rotation,
wherein an angle ($\beta$) with respect to the axis of rotation (175) is included between a point of action (205) of the worm (165) on the worm wheel (170) and a direction of action (A) of the rotation-prevention mechanism (185), and
wherein the angle ($\beta$) minimizes, for a predetermined torque acting on the nut (150), a radial force ($F_{piston}$) acting on the piston (115).

2. The actuator (100) as claimed in claim 1, wherein the radial bearing (155) allows a predetermined tilt of the nut (150) relative to the axis of rotation (175).

3. The actuator (100) as claimed in claim 1, wherein the radial bearing (155) is arranged between the nut (150) and the rotation-prevention mechanism (185) in an axial direction.

4. The actuator (100) as claimed in claim 1, wherein the angle ($\beta$) is determined with respect to a predetermined axial position of the rotation-prevention mechanism (185) along the spindle (145).

5. The actuator (100) as claimed in claim 1, wherein the angle ($\beta$) is determined with respect to a predetermined friction coefficient ($\mu$) between the worm (165) and the worm wheel (170).

6. The actuator (100) as claimed in claim 1, wherein the torque acting on the nut (150) is determined by way of an axial force acting on the piston (115) at a predetermined operating point.

7. The actuator (100) as claimed in claim 2, wherein the radial bearing (155) is arranged between the nut (150) and the rotation-prevention mechanism (185) in an axial direction.

8. The actuator (100) as claimed in claim 7, wherein the angle ($\beta$) is determined with respect to a predetermined axial position of the rotation-prevention mechanism (185) along the spindle (145).

9. The actuator (100) as claimed in claim 8, wherein the angle ($\beta$) is determined with respect to a predetermined friction coefficient ($\mu$) between the worm (165) and the worm wheel (170).

10. The actuator (100) as claimed in claim 9, wherein the torque acting on the nut (150) is determined by way of an axial force acting on the piston (115) at a predetermined operating point.

* * * * *